United States Patent [19]

Klee et al.

[11] Patent Number: 4,682,666
[45] Date of Patent: Jul. 28, 1987

[54] OPERATOR COMPARTMENT ASSEMBLY

[75] Inventors: Maurice Klee, Burlington, Iowa;
Robert T. Peterson, Gladstone, Ill.;
Gary L. Cochran, Burlington, Iowa;
James E. Dawson, Burlington, Iowa;
Robert M. Anderson, Burlington, Iowa

[73] Assignee: J. I. Case Company, Racine, Wis.

[21] Appl. No.: 687,794

[22] Filed: Dec. 31, 1984

[51] Int. Cl.⁴ ............................................. B62D 25/10
[52] U.S. Cl. .................................. 180/89.13; 180/89.17
[58] Field of Search ............... 180/89.13, 89.17, 89.16, 180/89.18, 89.19

[56] References Cited

U.S. PATENT DOCUMENTS

| 3,398,984 | 8/1968 | Ajero | 180/89.13 |
| 3,963,132 | 6/1971 | Dufour | 180/89.13 |
| 4,085,960 | 4/1978 | Sherman | 180/89.13 |
| 4,325,446 | 4/1982 | Hicks | 180/89.17 |
| 4,401,179 | 8/1983 | Anderson | 180/89.15 |
| 4,458,774 | 7/1984 | Sieren | 180/89.17 |

Primary Examiner—Richard A. Bertsch

[57] ABSTRACT

A movable cab structure and operator's compartment for a front end loader which permits complete access to all parts of the front end loader for easy servicing, repair or replacement work. In one embodiment, each base frame side member of the front end loader includes an elongated rail, a stop, and a bracket having a roller mounted thereon. Each side wall of the operator's compartment also includes an elongated rail and a roller which is mounted to the side wall by a bracket. As the operator's compartment is moved forwardly, the rails on the compartment side walls engage the rollers on the base frame side members while the rollers on the compartment side walls engage the underside of the rails on the base frame side members. The operator's compartment may then be easily moved forwardly to an extreme position until the rollers on the compartment side walls engage stops on the base frame side members. In a second embodiment, the cab structure is movable longitudinally on the side walls of the operator's compartment to an out-of-the-way position. Each compartment side wall includes a roller on its forward end for engaging an inwardly turned lip extending along the length of the cab structure. Each side of the cab structure includes a rear roller which rides along the upper end of a respective compartment side wall. In yet another embodiment of the invention, each base frame side member includes an upstanding flange member which forms a rail wherein the entire operator's compartment is capable of longitudinal movement. Rollers are uniquely arranged with respect to the rail to provide a simple effective mechanism that permits the operator's compartment to be moved forwardly.

12 Claims, 15 Drawing Figures

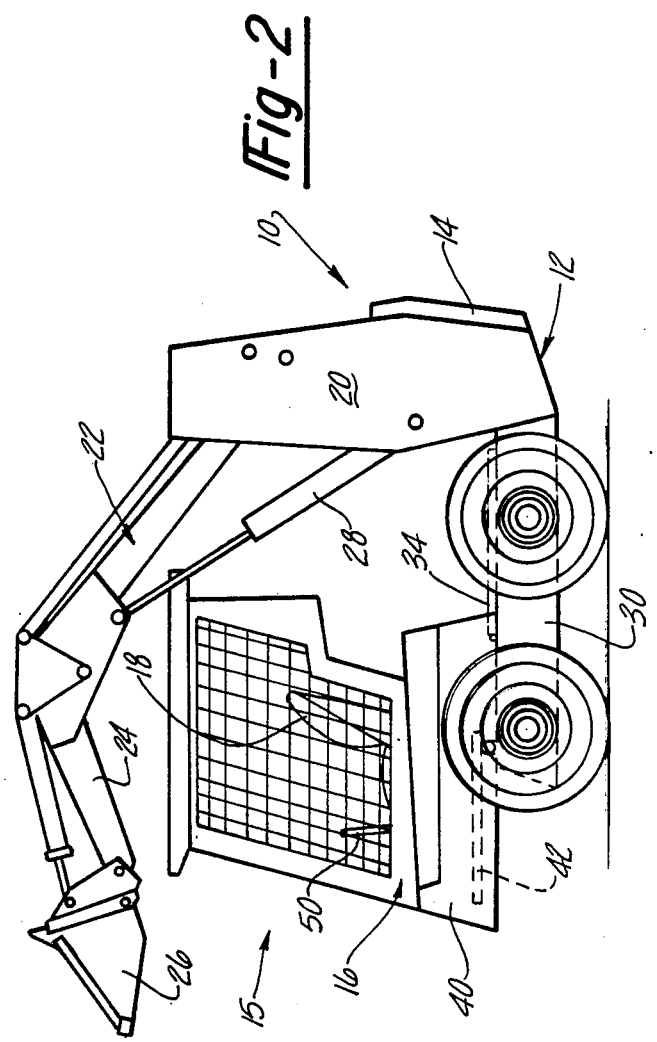
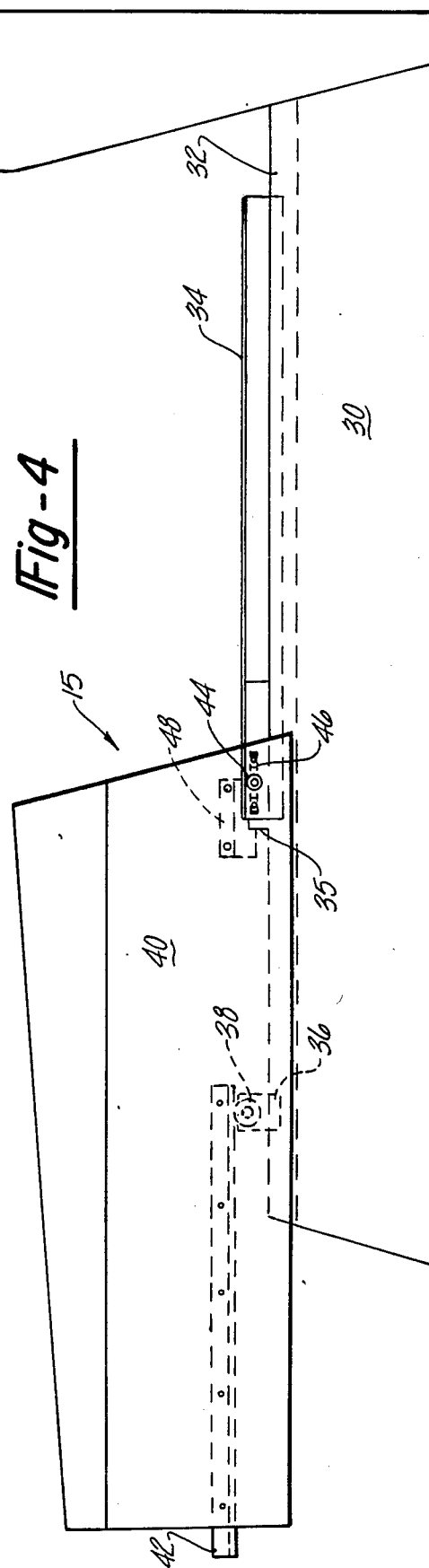

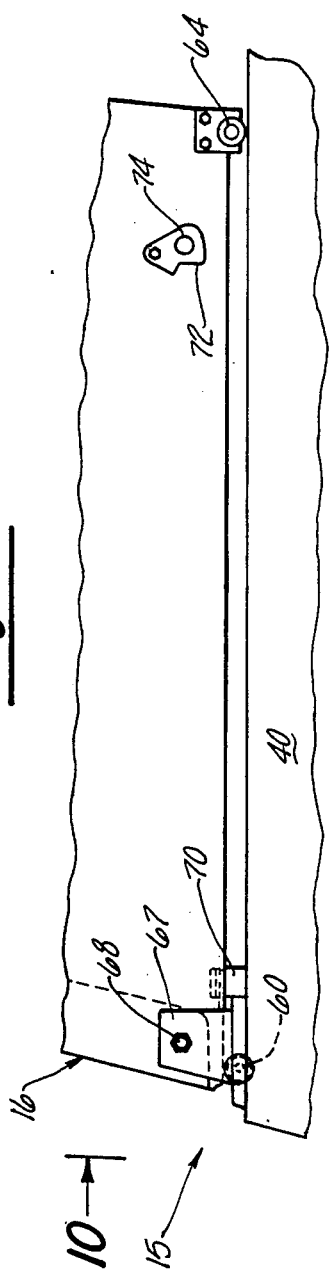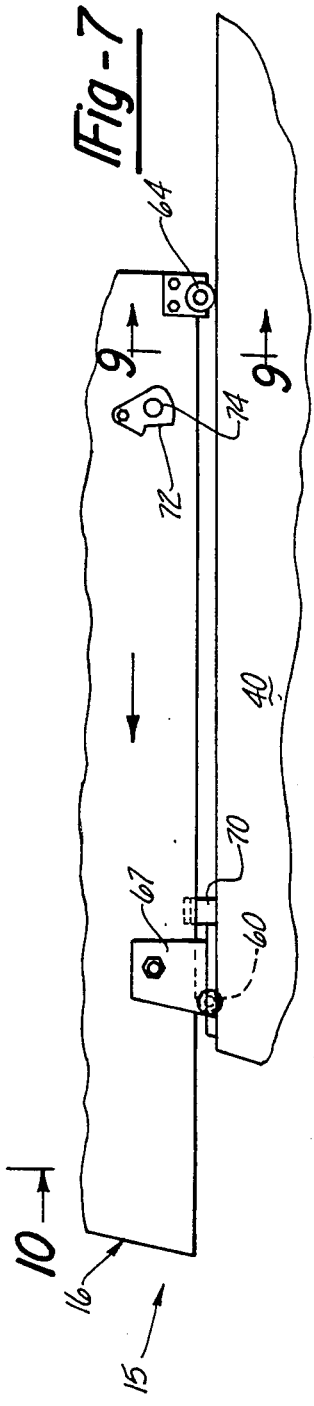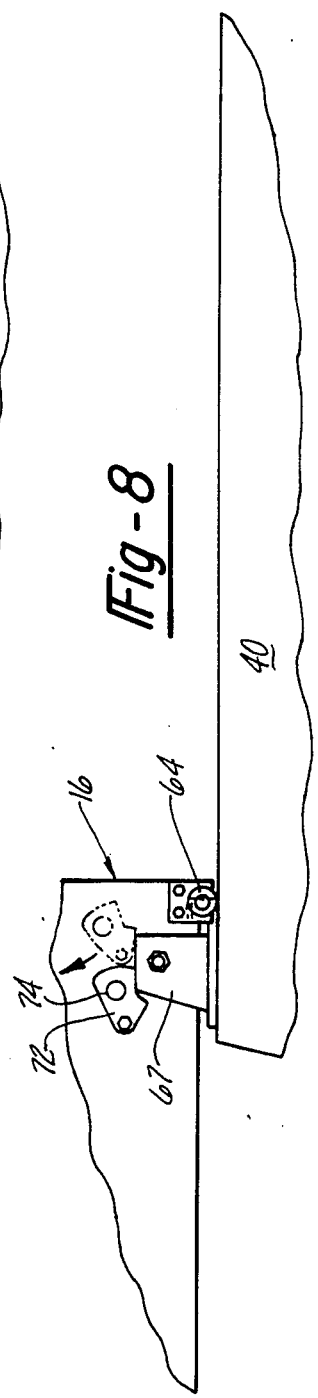

OPERATOR COMPARTMENT ASSEMBLY

BACKGROUND OF THE INVENTION

The present invention relates to a longitudinally movable operator's compartment assembly which permits complete access to all parts of a front end loader for easy servicing, repair or replacement.

The invention may be used in connection with a front end loader of the type having a material handling bucket supported for pivotal movement about a transverse axis on the forward end of a boom structure. The conventional front end loader disclosed herein includes an elongated body having an engine compartment adjacent the rear end thereof and an operator's compartment mounted on the body. In machines of this type, some form of cab or hood structure is provided for enclosing the operator's compartment. A problem arises because the cab structure prevents free access into the internal working parts of the machine for maintenance and repair work. Further, other parts of the operator's compartment also prevent complete access into parts within the body.

To overcome one of these problems, the cab or hood structure may be rotatably attached to the loader for permitting rotational movement of the cab structure about a horizontal axis that is transverse to the longitudinal axis of the machine. The cab structure may then be rotated to an out-of-the-way position which will allow the operator access into the operator's compartment for maintenance or repair work. However, rotation of the cab structure is difficult because of its weight and this does not permit access into the parts of the machine that are located beneath the operator's compartment. Thus, there has been a need for an easily movable cab structure or a movable operator's compartment which would permit complete access to all the machine parts for servicing, repair or replacement work.

It is, therefore, an object of the present invention to provide a cab structure or an operator's compartment that may be easily moved out of the way to permit complete access to the underlying machine parts within the loader frame for servicing or repair. It is a further object of the present invention to provide a structural inter-relationship between the cab structure or operator's compartment and loader base frame such that a simple unit may be readily manufactured without the use of special tools, fasteners or materials.

SUMMARY OF THE INVENTION

The present invention is disclosed in connection with a front end loader including an elongated base frame assembly having an engine compartment adjacent the rear end thereof and an operator's compartment mounted on the base frame assembly. A cab structure having the shape of an inverted open box encloses the operator's compartment. The cab structure or operator's compartment may be easily moved from a closed position to a forward position where the internal working parts of the machine are exposed for maintenance and repair work.

The base frame assembly is supported by ground engaging wheels and an engine is mounted on the rear end thereof. Vertical stanchions extend above the base frame assembly adjacent the rear end thereof on opposite sides of the engine. Lift arms are pivotally mounted adjacent the upper end of each stanchion. The lift arms extend forwardly along opposite sides of the operator's station and have front portions directed downwardly adjacent the front end of the base frame assembly. A material handling bucket is pivotally connected to the forward ends of the lift arm portions. The lift arms may be raised and lowered by lift cylinders. When it is desired to service or repair the engine or the fluid motors and the like which are located beneath the cab structure or operator's compartment, the operator's compartment or cab structure is moved to an out-of-the-way position.

In one embodiment of the invention, each base frame side member includes an upstanding flange to which is mounted an elongated generally L-shaped runner or rail, a stop, and a bracket having a roller mounted thereon. Each side wall of the operator's compartment also includes an elongated generally L-shaped runner or rail, a roller which is mounted to the side wall by a bracket, and a bracket which overlies the elongated rail on the base frame side member.

In this embodiment, the elongated rails on the side walls of the operator's compartment overlie the elongated rails mounted to the base frame side members when the operator's compartment is in its normal operating position. When it is desired to service or repair the engine or other parts which are located beneath the operator's compartment, the lift arms and bucket are raised and locked, the operator's seat and control handles are disconnected, and the fasteners which secure the operator's compartment to the base frame assembly are removed. This allows the operator's compartment to be moved forwardly along the opposed base frame side members.

As the operator's compartment is moved forwardly, the rails on the compartment side walls engage the rollers on the base frame side members while the rollers on the compartment side walls engage the underside of the rails on the base frame side members. The compartment may then be easily moved forwardly to an extreme position until the rollers on the compartment side walls engage stops which are secured to the base frame side members. The engagement of the rollers on the compartment side walls with the underside of the rails on the base frame side members also prevents the operator's compartment from tilting when it has been moved forwardly. Thus, the rails and rollers are uniquely arranged to provide a simple yet effective mechanism that permits the operator's compartment to be moved forwardly conveniently.

In a second embodiment of the invention, the cab or hood structure is movable longitudinally on the side walls or fenders of the operator's compartment to an out-of-the-way position. In this embodiment, each side wall of the operator's compartment includes a roller rotatably journaled on the forward end thereof for engaging and supporting an inwardly turned lip extending along the length of the lower end of the cab structure. The rear end of each side of the cab structure includes a roller which supports the cab and rides along the upper end of the compartment side wall or fender. The forward end of each compartment side wall also includes upstanding inboard and outboard lugs for mounting a fastener which secures the cab structure in place until it is desired to move the cab structure out of the way. The fastener is removed which permits the cab structure to be moved longitudinally relative to the compartment side walls.

A guide member is mounted to each compartment side wall for guiding the cab during its longitudinal movement and for preventing forward tipping of the cab structure when it is moved forwardly. The forward longitudinal movement of the cab structure is stopped when the rear cab rollers engage the outboard lugs on the compartment side walls. Further, a rotatable latch is provided on the cab structure which engages and latches into position against the outboard lugs when the cab structure has reached the limit of its forward travel for preventing return movement by the cab structure.

In yet another embodiment of the invention, each base frame side member includes an upstanding flange member which forms a rail or runner wherein the entire operator's compartment is capable of longitudinal movement relative to the rail. The forward end of each base frame side member includes a roller which engages and rollingly supports an inwardly directed lip extending along the length of the lower end of each compartment side wall or fender. The rear end of each compartment side wall includes a pair of opposed rollers which engage the top and bottom of the rail. An arm associated with the rear rollers engages a stop on the base frame member to limit the forward out-of-the-way longitudinal movement of the operator's compartment.

Other advantages and meritorious features of the roll-out operator's compartment will be more fully understood from the following description of the invention, the appended claims and the drawings, a brief description of which follows.

BRIEF DESCRIPTION OF DRAWINGS

FIG. 2 is a side elevational view of the front end loader illustrating the entire operator's compartment in its forward position.

FIG. 4 is a partial side elevational view of the first embodiment illustrating the rollers and rails when the operator's compartment is rolled out.

FIG. 6 is a partial side elevational view of a second embodiment illustrating the cab structure relative to the operator's compartment when the cab structure is closed.

FIG. 7 is a partial side elevational view of the assembly shown in FIG. 6 illustrating the movement of the cab structure relative to the operator's compartment.

FIG. 8 is a partial side elevational view of the assembly shown in FIGS. 6 and 7 illustrating the forward position of the cab structure relative to the operator's compartment.

DETAILED DESCRIPTION OF THE INVENTION

Figure 1:
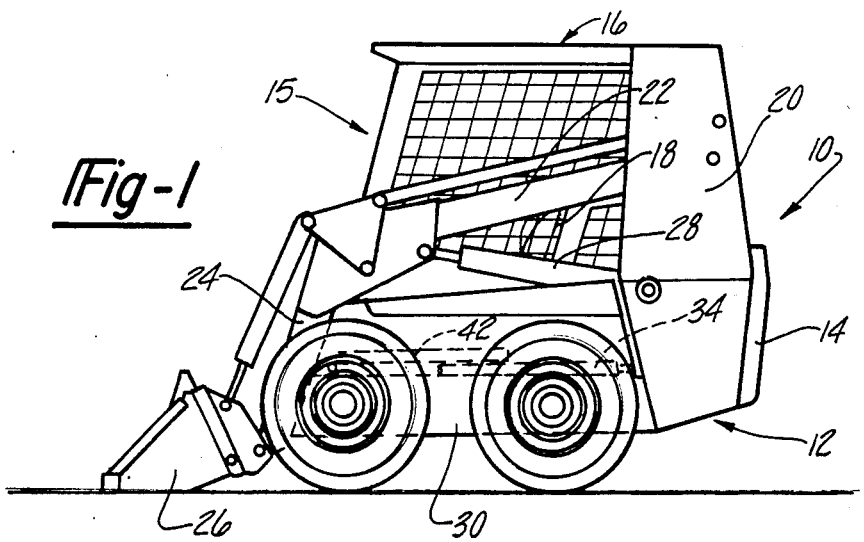
FIG. 1 is a side elevational view of a front end loader utilizing the movable cab structure and operator's compartment of the present invention.

While this invention is susceptible of embodiment in many different forms, there is shown in the drawings and will herein be described in detail certain specific embodiments, with the understanding that the present disclosure is to be considered as an exemplification of the principles of the invention and is not intended to limit the invention to the embodiments illustrated.

FIG. 1-5 of the drawings generally disclose one embodiment of the present invention comprising a front end loader 10 consisting of an elongated base frame assembly 12, an engine compartment 14, and an operator's compartment 15 including a cab or hood structure 16 and seat 18, with the seat located within the cab structure between opposite sides of the base frame assembly 12.

Since the remaining elements to be described, with the exception of the bucket, are duplicated on opposite sides of the base frame assembly 12, only one set of elements has been shown with the understanding that the description will likewise refer to an identical set of elements located on the opposite side of the base frame assembly 12.

A pair of transversely spaced stanchions or uprights 20 extend upwardly along opposite sides of the engine compartment 14 and terminate at a location spaced above the operator's seat 18. A lift arm 22 is pivotally connected at one end to the upper end of each of the uprights 20. The lift arms 22 have front portions 24 directed adjacent the front end of the base frame assembly 12. A material handling bucket 26 is pivotally connected to the forward ends of lift arm portions 24. The lift arms 22 are moved between lowered and raised positions by conventional fluid rams 28.

The present invention relates to a construction for allowing movement of the entire operator's compartment 15 or portions thereof to a forward position as shown in FIG. 2 to permit complete access to all parts of the front end loader 10 for easy servicing, repair or replacement. When it is desired to service or repair the engine or the fluid motors and the like which are located beneath the operator's compartment 15, the entire operator's compartment 15 may be moved longitudinally along the base frame opposed side members 30 to an out-of-the-way position such as shown in FIG. 2. Alternatively, a portion of the operator's compartment 15, such as the cab structure 16, may be moved longitudinally to an out-of-the-way position.

Figure 5:
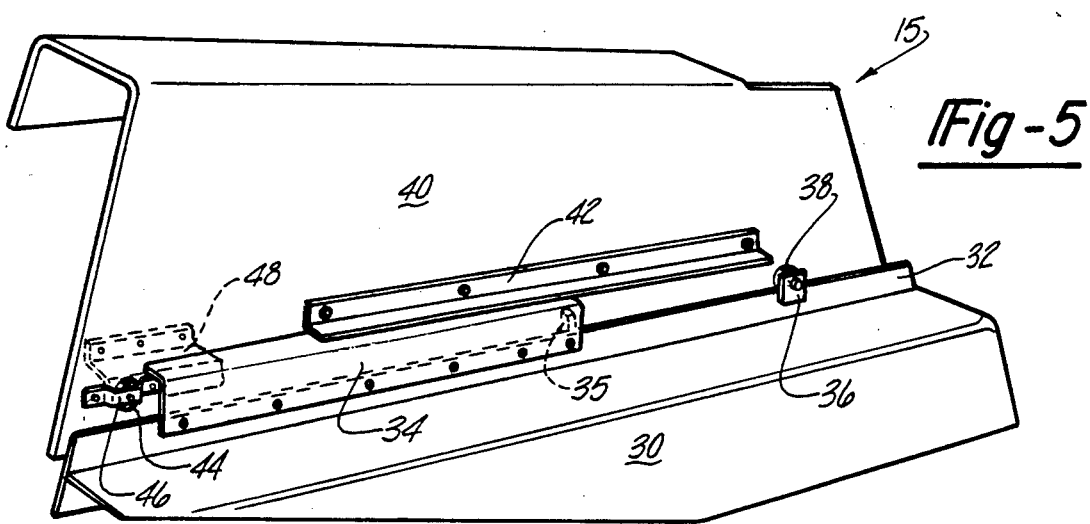
FIG. 5 is an assembly view of the first embodiment illustrating the rails and rollers which permit the operator's compartment to be rolled forwardly.
Figure 9:
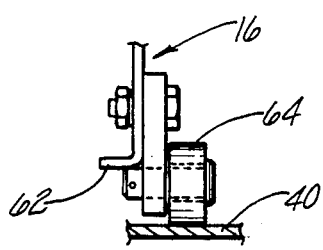
FIG. 9 is a view of the rear roller taken along line 9—9 in FIG. 7.
Figure 10:
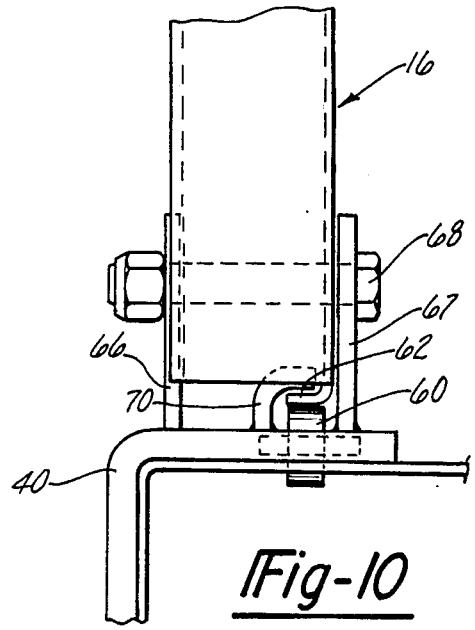
FIG. 10 is a view taken along line 10—10 in FIG. 6.
Figure 11:
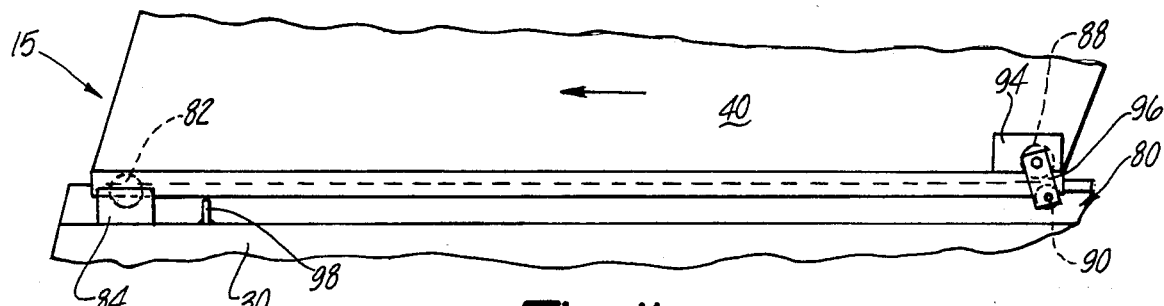
FIG. 11 is a partial side elevational view of another embodiment illustrating the operator's compartment in a closed position.

Referring to FIG. 5, each base frame side member 30 includes an upstanding flange 32 to which is mounted an elongated generally L-shaped runner or rail 34, a stop 35, and a bracket 36 having a roller 38 mounted thereon. Each side wall 40 of the operator's compartment 15 also includes an elongated generally L-shaped runner or rail 42, a roller 44 which is mounted to side wall 40 by bracket 46, and a bracket 48 which overlies elongated rail 34.

Figure 3:
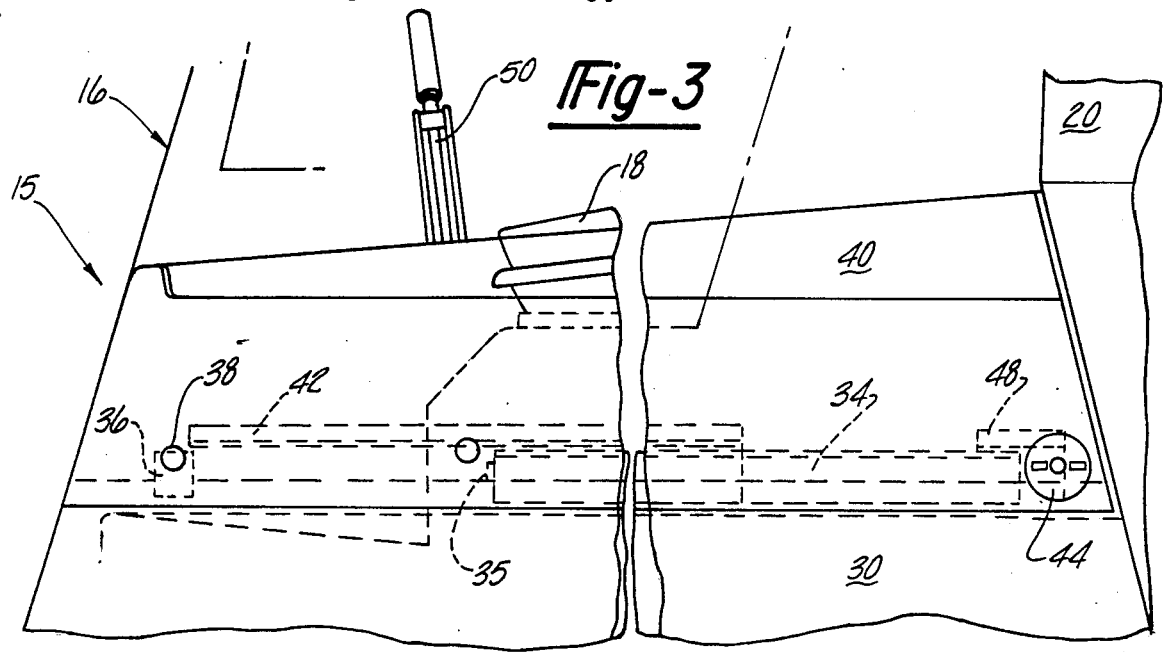
FIG. 3 is a partial side elevational view of a first embodiment illustrating the position of the rails and rollers when the operator's compartment is closed.

FIGS. 1, 3 and 5 illustrate the operator's compartment 15 in its normal operating position with a substantial portion of elongated rail 42 overlying rail 34. In this position, rail 42 is spaced from and not engaged with roller 38 and rail 34 is spaced from and not engaged with roller 44. When it is desired to service or repair the engine within compartment 14 or the fluid motors and the like which are located beneath operator's compartment 15, the lift arms 22 and bucket 26 are raised and locked as shown in FIG. 2, the operator's seat 18 and control handles 50 are disconnected, and the fasteners (not shown) which secure the operator's compartment 15 to base frame assembly 12 are removed. This allows the operator's compartment 15 to be moved forwardly as shown in FIGS. 2 and 4 to permit complete access to the various parts of loader 10 for easy servicing, repair or replacement.

As compartment 15 is moved forwardly, rail 42 engages roller 38 while roller 44 engages the underside of rail 34. Operator's compartment 15 may then be easily moved forwardly to an extreme position as shown in FIGS. 2 and 4 until roller bracket 46 engages stop 35. The engagement of roller 44 with the underside of rail 34 also prevents compartment 15 from tilting counterclockwise as viewed in FIG. 4. Similarly, tilting of compartment 15 in an opposite direction is prevented by bracket 48.

Thus, rails 34, 42 and rollers 38, 44 are uniquely arranged to provide a simple, yet very effective, mechanism that permits operator's compartment 15 to be rolled out conveniently. That is, rail 42 and roller 44 are linearly movable with side wall 40 such that rail 42 engages and slides across roller 38 and roller 44 rolls along the underside of rail 34 thereby providing ease of movement with a means for limiting travel and a restraining means to prevent tilting of the movable operator's compartment when it is shifted forwardly.

Referring now to FIGS. 6-10, a second embodiment is illustrated wherein the cab structure 16 is movable longitudinally on the side walls or fenders 40 of operator's compartment 15 to an out-of-the-way position. Each side wall 40 includes a roller 60 rotatably jounaled on the forward end thereof for engaging and supporting an inwardly turned lip 62 (FIG. 10) extending along the length of the lower end of cab structure 16. The rear end of cab structure 16 includes rollers 64 on opposed sides which support cab structure 16 and ride along the upper end of each side wall or fender 40. The forward end of each side wall also includes upstanding inboard and outboard lugs 66 and 67 for mounting a fastener 68 which secures cab structure 16 in place until it is desired to move cab 16 out of the way. Fastener 68 may be removed which will permit cab structure 16 to be moved longitudinally as shown in FIGS. 6-8 with rear rollers 64 riding on the top ends of side walls 40 to support the rear end of the cab structure 16 and lips 62 riding on and being supported by front rollers 60.

A guide member 70 is mounted to each side wall 40 adjacent to lip 62 for guiding cab structure 16 during its longitudinal movement and for preventing forward tipping of cab 16 when it is moved forwardly as shown in FIGS. 7 and 8. The forward longitudinal movement of cab structure 16 is stopped when rear cab rollers 64 engage the outboard lugs 67 on side walls 40. Further, a rotatable latch 72 is provided on cab structure 16 which engages and latches into position against an outboard lug 67 when cab structure 16 has reached the limit of its foward travel as shown in FIG. 8 thereby preventing return movement by the cab structure 16. Latch 72 is released to permit return movement of cab structure 16 by inserting a tool or the like into latch opening 74 and rotating latch 72 until it assumes a position such as shown in phantom lines in FIG. 8.

Figure 14:
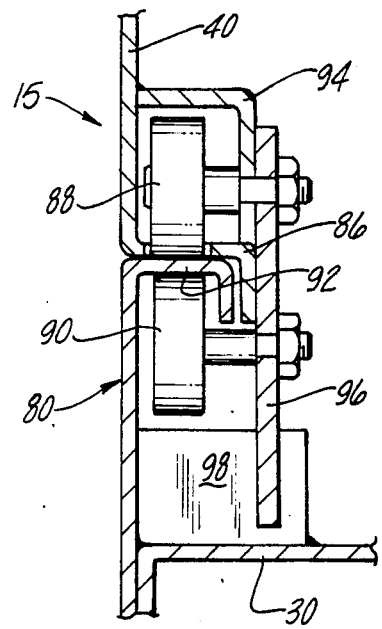
FIG. 14 is a view, partly in cross-section, taken along line 14—14 in FIG. 13.

FIGS. 11-15 illustrate yet another embodiment of the present invention wherein each base frame side member 30 includes an upstanding flange member 80 which forms a rail or runner wherein the entire operator's compartment 15 is capable of longitudinal movement relative to rail 80. The forward end of each base frame side member 30 includes a roller 82 rotatably mounted to a bracket 84. Forward rollers 82 engage and rollingly support inwardly directed lips 86 extending along the length of the lower end of each side wall or fender 40. The rear end of each side of operator's compartment 15 includes a pair of rear rollers 88 and 90 with roller 88 engaging the top of ledge 92 on flange member 80 and roller 90 engaging the bottom of ledge 92 as shown in FIG. 14. Each rear roller 88 is rotatably mounted to bracket 94 and each roller 90 is rotatably mounted to arm 96 which is fixed to and extends downwardly from bracket 94. Arm 96 engages stop 98 on frame member 30 to limit the forward out-of-the-way longitudinal movement of operator's compartment 15.

Figure 12:
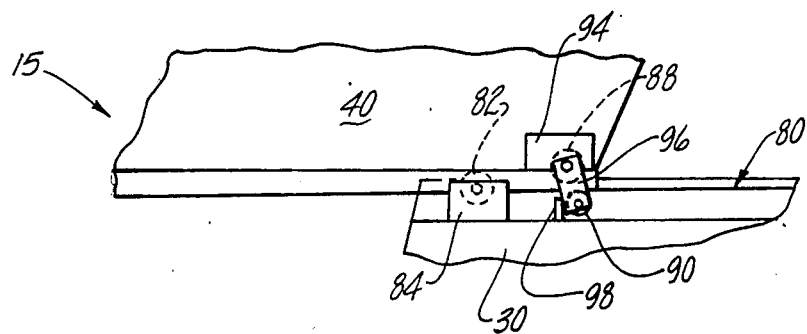
FIG. 12 is a partial side elevational view of the embodiment shown in FIG. 11 illustrating the extreme forward movement of the operator's compartment.
Figure 13:
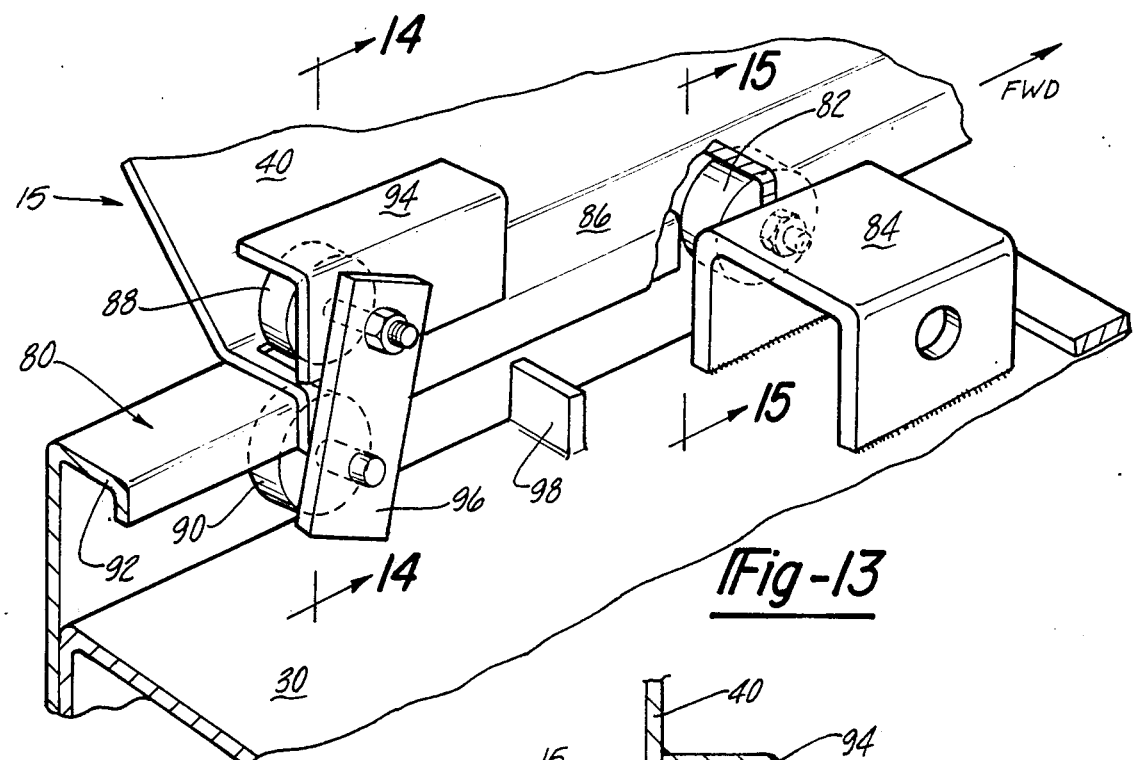
FIG. 13 is a perspective view of the rollers and rails utilized in the embodiment shown in FIGS. 11 and 12.
Figure 15:
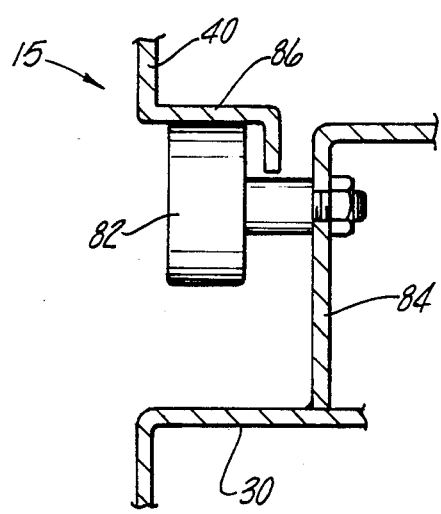
FIG. 15 is a view, partly in cross-section, taken along line 15—15 in FIG. 13.

As compartment 15 is moved forwardly, each rear roller 88 rides on ledge 92 and supports compartment 15 while each roller 90 prevents forward tipping of the compartment. Each front roller 82 engages and supports lip 86 on side wall 40 to permit easy forward movement of compartment 15 to an extreme position as shown in FIG. 12 until arm 96 engages stop 98.

It will be apparent to those skilled in the art that the foregoing disclosure is exemplary in nature rather than limiting, the invention being limited only by the appended claims.

We claim:

1. In a front end loader including a base frame assembly having opposed side members, an engine compartment adjacent one end of said base frame assembly, vertical members extending above said base frame assembly adjacent said one end thereof, and an operator's compartment mounted on said base frame assembly with the operator's compartment including opposed side walls and a cab structure, the improvement comprising:

means associated with said opposed compartment side walls and said opposed base frame side members for permitting said operator's compartment to be moved longitudinally along said opposed base frame side members from a closed position wherein said operator's compartment is substantially in engagement with said vertical members to a forward position wherein said operator's compartment does not obstruct access to the base frame assembly for servicing or repair work; and wherein each base frame side member including a first guide means and each said compartment side wall including a second guide means, first contact means on said base frame side member cooperating with said second guide means and second contact means on said compartment side wall cooperating with said first guide means whereby said first and second contact means permitting relative movement between said first and second guide means.

2. The front end loader as defined in claim 1 wherein each base frame side member includes a first elongated rail and a first roller means spaced from said first rail and each of said opposed compartment side walls includes a second elongated rail and a second roller means spaced from said second rail, said second elongated rail overlying said first elongated rail when said operator's compartment is in its closed position, said second rail engaging said first roller means and said second roller means engaging said first rail when said operator's compartment is moved toward its forward position.

3. The front end loader as defined in claim 2 wherein each of said rails being generally L-shaped and said first rail including a surface which is engaged by said second rail and said first rail including an opposite surface which is engaged by said second roller means for preventing tilting of said operator's compartment in its forward position.

4. The front end loader as defined in claim 3 wherein each of said base frame side members including a stop which is engaged by said second roller means when said operator's compartment is moved to its forward position.

5. The front end loader as defined in claim 1 wherein each base frame side member includes a first elongated rail and a first roller means and each of said opposed compartment side walls includes a second elongated rail and a second roller means, said second rail engaging said first roller means and said second roller means engaging said first rail when said operator's compartment is moved toward its forward position.

6. The front end loader as defined in claim 5 wherein said first rail including a surface which is engaged by a first roller of said second roller means and said first rail including an opposite surface which is engaged by a second roller of said second roller means for preventing tilting of said first operator's compartment.

7. The front end loader as defined in claim 6 wherein at least one of said base frame side members including a stop which is engaged by an arm on said second roller means when said operator's compartment is moved to its forward position.

8. In a front end loader including a base frame assembly having opposed side members, an engine compartment adjacent one end of said base frame assembly, vertical members extending above said base frame assembly adjacent said one end thereof, and an operator's compartment mounted on said base frame assembly with the operator's compartment including opposed side walls and a cab structure, the improvement comprising:

means associated with said opposed compartment side walls and said cab structure for permitting said cab structure to be moved longitudinally along said opposed compartment side walls from a closed position wherein said cab structure is substantially in engagement with said vertical members to a forward position wherein said cab structure does not obstruct access to the operator's compartment for servicing or repair work; and wherein said cab structure including opposed side walls, each compartment side wall including a first guide means and each cab structure side wall including a second guide means, first contact means on said compartment side wall cooperating with said second guide means and second contact means on said cab structure side wall cooperating with said first guide means whereby said first and second contact means permitting relative movement between said first and second guide means.

9. The front end loader as defined in claim 8 wherein each compartment side wall including a first elongated rail and a first roller means and each of said cab structure side walls including a second elongated rail and a second roller means, said second rail engaging said first roller means and said second roller means engaging said first rail when said cab structure is moved toward its forward position.

10. The front end loader as defined in claim 9 wherein each of said second rails including a surface which is engaged by said first roller means and an opposite surface which is engaged by a member on said compartment side wall for preventing tilting of said cab structure in its forward position.

11. The front end loader as defined in claim 10 wherein at least one of said compartment side walls including a stop which is engaged by said second roller means when said cab structure is moved to its forward position.

12. The front end loader as defined in claim 11 wherein said cab structure including a rotatable latch engaging said stop when said cab structure is moved to its forward position for preventing reverse movement of said cab structure.

* * * * *